Aug. 10, 1965     H. KOFFLER     3,199,737
COLLAPSING DEVICE FOR TUBULAR CONTAINER
Filed Jan. 30 1964     2 Sheets-Sheet 2
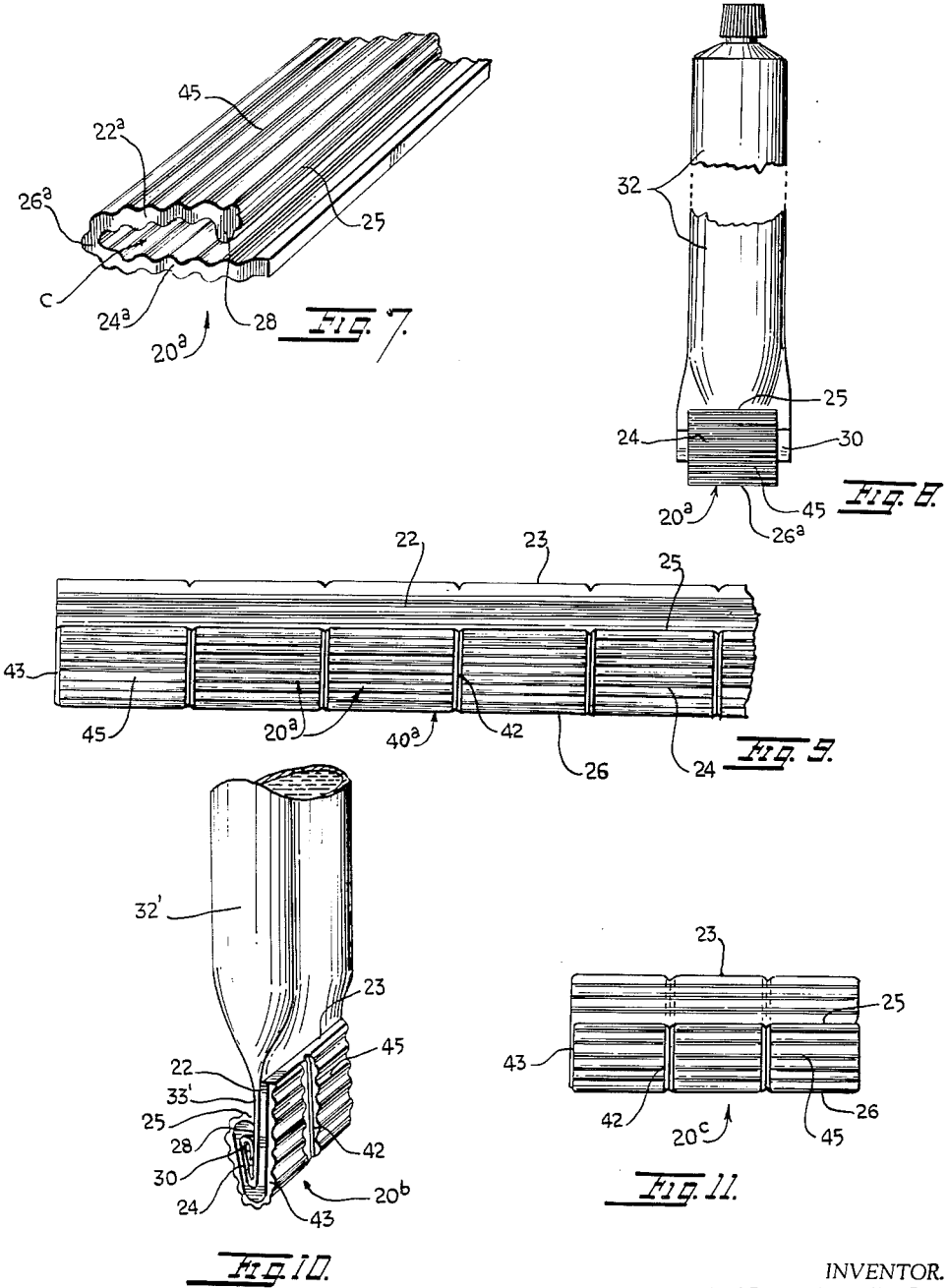
INVENTOR.
HENRY KOFFLER
BY Polachek & Saulsbury
ATTORNEYS United States Patent Office 3,199,737
Patented Aug. 10, 1965

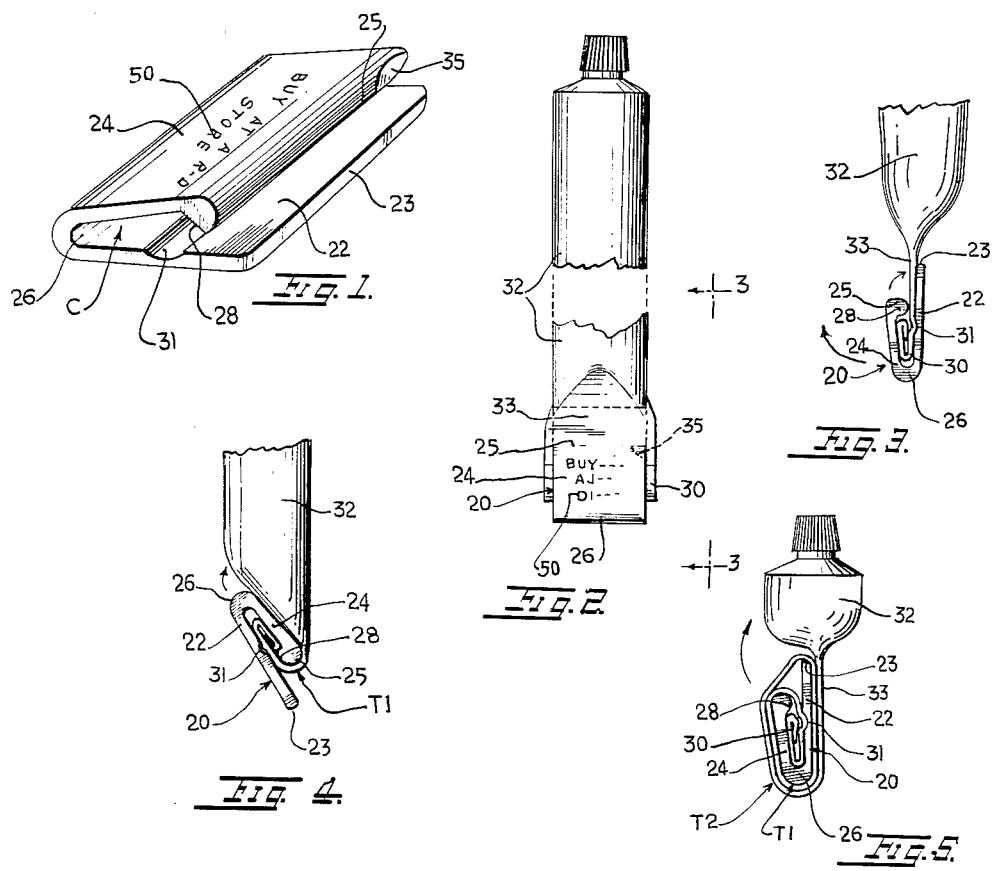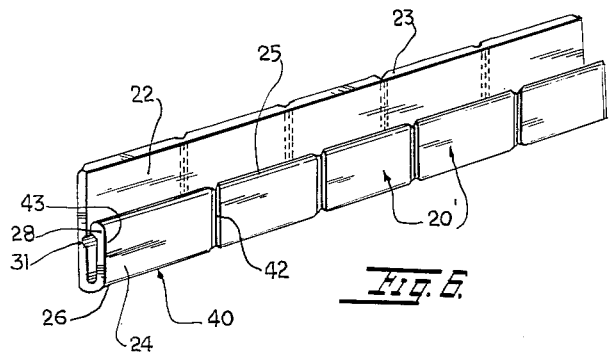

3,199,737
COLLAPSING DEVICE FOR TUBULAR CONTAINER
Henry Koffler, 119 Sutton Drive, Plainview, N.Y.
Filed Jan. 30, 1964, Ser. No. 341,239
4 Claims. (Cl. 222—99)

This invention relates to collapsing devices for dispensing tubes or containers of such materials as toothpaste, shaving cream, and the like. More particularly, the invention concerns an improved device for coiling one end of a tube of the category referred to as the semifluid paste filling of the tube is discharged from the other end.

According to the invention, the coiling or collapsing device has a channeled structure with opposing wider and narrower walls. The narrower wall has a ridge thereon which engages on the closed, crimped end of a pliable tube inserted in the device. The wider end of the device can be employed as a lever to start winding or coiling the closed end of the tube around the device. The device is preferably made of plastic, metal or other moldable material. The device can be made by continuous extrusion of a channel-shaped molding from a plastic or metal molding machine. The extruded molding can then be cut into sections, each of which constitutes a tube collapsing device. In one form of the invention, sides of the device can be made with parallel corrugations to facilitate grasping and turning the device on the tube and to prevent slippage of the device in the coiled tube. The corrugated device can also be made by continuous extrusion of a plastic or metal molding. Cross grooves or score lines can be made in the extruded molding to facilitate cutting or breaking the molding into sections.

It is therefore a principal object of the invention to provide a coiling or winding device for collapsing a tube, wherein the device includes a channel-shaped body of substantially uniform cross section throughout its length.

A further object is to provide a device as described, wherein the channel-shaped body has wider and narrower opposed sides, with an internal ridge on the free edge of the narrower side.

Another object is to provide a device as described, wherein parallel, longitudinal corrugations are formed on the sides of the device.

Still another object is to provide a tube coiling or collapsing device which can be extruded in extended lengths or continuously from a metal or plastic molding machine.

A further object is to provide a molded metal or plastic extrusion with transverse grooves facilitating the breaking of the extrusion into short sections adapted to serve as tube coiling or collapsing devices.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an enlarged perspective view of a tube collapsing device embodying the invention.

FIG. 2 is a side elevational view of the device on a reduced scale shown attached to a pliable tube in position for collapsing the tube, part of the tube being broken away.

FIG. 3 is a side elevational view taken 90° from the view of FIG. 2 on line 3—3 of FIG. 2.

FIGS. 4 and 5 are elevational views similar to FIG. 3, showing the device in subsequent stages of collapsing the tube.

FIG. 6 is a perspective view of an extruded molding according to the invention.

FIG. 7 is an enlarged perspective view of another tube collapsing device.

FIG. 8 is an elevational view similar to FIG. 2 showing the device of FIG. 7 on a reduced scale mounted on and in position for collapsing a tube, part of the tube being broken away.

FIG. 9 is a side elevational view of an extruded molding according to the invention.

FIG. 10 is a perspective view of a double length collapsing device shown mounted on a wide tube, part of the tube being broken away.

FIG. 11 is a front elevational view of a triple length collapsing device.

Referring first to FIGS. 1, 2 and 3, the tube collapsing device 20 as shown has a channel-shaped body with a generally rectangular wider side 22 and a generally rectangular side wall 24 integrally joined to wall 22 by a transversely curved narrow back or end wall 26.

Wall 24 diverges slightly from wall 22 toward the free edges 23, 25 of the walls 22, 24. The free edge 25 of narrower wall 24 is formed with an internal ridge or bead 28. The external surface of edge 25 is rounded or beveled to enable insertion of the twisted and crimped end 30 of a tube 32 to be inserted into the device. A notch 35 may be formed in one end of the edge 25 of wall 24 to facilitate this insertion of end 30 of the tube 32 into the device. The device is preferably made of substantially rigid material having some slight flexibility at the end wall 26 so that the walls yield to permit the crimped end 30 of tube 32 to enter the deep channel C in the device. Once the crimped end 30 is engaged by the bead 28, the device will be effectively locked to the tube. If desired, a shallow longitudinal groove 31 can be provided in the inner side of wall 22 just beyond the opposing bead 28 to receive the crimped end 30 after it is passed beyond and engaged by bead 28.

FIGS. 2 and 3 show the tube collapsing device 20 in position for winding or coiling the closed bottom portion 33 of the tube 32 whose crimped end 30 is engaged in the device. The device will be turned clockwise as viewed in FIGS. 3, 4 and 5 while the tube is held axially vertical and stationary. During the first turn or revolution of the device the outer portion of side wall 22 extending outwardly beyond wall 24 will be grasped, while the tube is wound around edge 25 as a fulcrum. FIG. 4 shows the device about to complete a first half turn of the tube end portion 33. The back end wall 26 will serve as a fulcrum for completing the second half turn. FIG. 5 shows the tube with two full turns T1 and T2 wound on the device. The first turn is completed by winding the tube end portion around the free edge 23 of side wall 22. In FIG. 5 the tube is shown about to be wound on edge 23 again over the end of turn T1.

FIG. 6 shows an extruded molding 40 from which devices 20 can be made. The molding has an indefinite length with opposing wider side wall 22' and narrower side wall 24' defining channel C'. Bead 28' extends longitudinally of the inner free rounded edge 25' of wall 24'. This molding can be cut transversely at any desired longitudinal intervals to make devices of any required length. The molding can be provided with transverse score lines or grooves 42 spaced apart at equal distances along the molding. These lines can be used as guide lines for cutting the molding into sections 20' each of which will have the length of a single device 20. If the material of the molding is easily breakable, the molding can be broken at the grooves 42 to form the individual sections 20'. The grooves 42 preferably extend around the outer surfaces of the walls 22, 24 from the upper free edge 23 of wall 22 down around the rounded back wall 26 and terminated at beveled or rounded free edge 25 of wall 24. The molding can be provided with longitudinal groove 31.

After the sections 20' are broken off from the molding, they are in condition for serving as tube collapsing devices as they are. If further finishing is desired, the end notches 35 can be formed, corners can be rounded, and the broken ends 43 of the sections 20' can be smoothed on a suitable grinding machnie. The finishing of the sections can be done automatically at high speed in known types of metal and plastic working machines. Advertising indicia 50 as indicated in FIGS. 1 and 2 can also be applied.

FIG. 7 and FIG. 8 show a tube collapsing device 20a which is similar to device 20 and corresponding parts are similarly numbered. The device 20a is formed with longitudinal corrugations 45 on the external and internal sides of walls 22, 24 and 26. These corrugations enable the external sides of the walls to be manually grasped more firmly when the device is being turned. The internal and external corrugated surfaces of the device grip the turns of the coiled tube 32 more effectively than is possible with the smooth walls of device 20. The device 20a is made of slightly flexible plastic or metal material and is used in the same manner as illustrated for device 20 in FIGS. 3–5.

FIG. 9 shows an extruded molding 40a of extended length similar to molding 40, which can be cut into individual sections 20a' to make devices 20. The transverse score lines 42 are provided to facilitate breaking or cutting the molding into sections. Other parts corresponding to molding 40 are identically numbered.

If a tube collapsing device of double length is required, the molding 40' can be broken at alternate score lines or grooves 42. FIG. 10 shows device 20b thus formed having a double length. This device will be used for coiling the end 33' of a tube 32' having a width double that of tube 32. If a tube collapsing device of triple or greater length is required for a very wide tube, then the molding 40' can be broken at every fourth or fifth score line or groove. FIG. 11 shows the tube collapsing device 20c having a triple length. The molding 40 can also be broken or cut into sections of single, double, triple or greater length.

The tube collapsing devices illustrated and described and the metal or plastic molding from which they may be made, can be fabricated at very low cost. They may be supplied by manufacturers of toothpaste and other paste products already attached to the tubes, or can be given by retailers to customers as free premiums at the times the tubes are sold. If desired, the external surfaces of the devices can be printed with appropriate advertising indicia 50 as indicated in FIGS. 1 and 2. Since the devices are very inexpensive they can be discarded with the collapsed tubes when the contents of the tubes are consumed.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A coiling device for winding a flattened end portion of a collapsible tube having a crimped end, comprising a channel-shaped body having a pair of diverging generally rectangular walls defining a channel therebetween for receiving said end of the tube, one of said walls being wider than the other wall to provide a free end portion extending beyond a free edge of the other wall to be grasped and turned while winding the flattened end portion of the tube around said body, the narrower other wall having a bead formed at its free edge extending inwardly toward the wider wall for engaging the crimped end of the tube in said channel, said free edge of the narrower other wall being notched below said bead to facilitate entry of the crimped end of the tube into said channel, opposite sides of both of said walls being formed with parallel corrugations extending lengthwise of said body to facilitate grasping said walls for turning said body on the tube and for gripping turns of the coiled end portion of the tube.

2. A coiling device for winding a flattened end portion of a collapsible tube having a crimped end, comprising a channel-shaped body having a pair of diverging generally rectangular walls defining a channel therebetween for receiving said end of the tube, one of said walls being wider than the other wall to provide a free end portion extending beyond a free edge of the other wall to be grasped and turned while winding the flattened end portion of the tube around said body, the narrower other wall having a bead formed at its free edge extending inwardly toward the wider wall for engaging the crimped end of the tube in said channel, opposite sides of both of said walls being formed with parallel corrugations extending lengthwise of said body to facilitate grasping said walls for turning said body on the tube and for gripping turns of the coiled end portion of the tube.

3. A molding for forming devices adapted to coil flattened end portions of collapsible tubes having crimped ends, comprising a channel-shaped body having a pair of diverging walls defining a channel therebetween, one of said walls being wider than the other wall, the narrower other wall having a bead formed at its free edge extending toward the wider wall, the free edge of the narrower wall being notched below said bead, and grooves spaced apart lengthwise of said body and extending around outer sides of said walls transversely thereof to facilitate breaking said body into short sections having lengths determined by the spacing of said grooves, each of said sections forming one of said devices.

4. A molding for forming devices adapted to coil flattened end portions of collapsible tubes having crimped ends, comprising a channel-shaped body having a pair of diverging walls defining a channel therebetween, one of said walls being wider than the other wall, the narrower other wall having a bead formed at its free edge extending toward the wider wall, the free edge of the narrower wall being notched below said bead, said walls having corrugations formed thereon and extending parallel to each other lengthwise of said walls on opposite sides thereof, and grooves spaced apart lengthwise of said body and extending around outer sides of said walls transversely thereof to facilitate breaking said body into short sections having lengths determined by the spacing of said grooves, each of said sections forming one of said devices.

References Cited by the Examiner

UNITED STATES PATENTS

| 653,912 | 7/00 | Heggie. | |
| 1,754,403 | 4/30 | Reubush | 222—99 |
| 2,161,516 | 6/39 | Jung | 222—99 |
| 2,838,207 | 6/58 | Freed | 222—99 |
| 2,851,191 | 9/58 | Krystosek | 222—99 |

EVERETT W. KIRBY, *Primary Examiner.*

RAPHAEL M. LUPO, *Examiner.*